United States Patent

Ban et al.

[11] Patent Number: 5,169,171
[45] Date of Patent: Dec. 8, 1992

[54] SUPPORTING STRUCTURE FOR VEHICULAR SUSPENSION

[75] Inventors: Yukimasa Ban, Zama, Japan; Noboru Tateishi, Northville, Mich.

[73] Assignee: Nissan Motor Co., Ltd., Yokohama, Japan

[21] Appl. No.: 702,905

[22] Filed: May 21, 1991

[30] Foreign Application Priority Data

May 25, 1990 [JP] Japan .................................. 2-136636

[51] Int. Cl.[5] ............................................. B60G 1/00
[52] U.S. Cl. .................................... 280/688; 280/690; 248/573
[58] Field of Search ............... 280/688, 788, 787, 673, 280/690, 693, 698, 666, 696; 267/257; 248/573, 564

[56] References Cited

U.S. PATENT DOCUMENTS 2,736,570 2/1956 Crane .................................. 280/666

OTHER PUBLICATIONS

"Steering Suspension," Jidosha Kougaku Zensho (Automotive Engineering Encyclopedia), vol. 11, Aug. 1985, p. 117.

Primary Examiner—Charles A. Marmor
Assistant Examiner—Paul Dickson
Attorney, Agent, or Firm—Foley & Lardner

[57] ABSTRACT

A supporting structure for an upper link of a vehicular suspension whose camber is adjusted by a cam plate attached to the upper link, has a pair of U-shaped upper link brackets which are fixed side by side to a side member of a vehicle. A generally U-shaped shock absorber is fixed to both the upper link brackets to support a shock absorber and the upper link. A rebound bumper unit is installed to the upper link berackets to absorb a shock from the upper link.

4 Claims, 2 Drawing Sheets

SUPPORTING STRUCTURE FOR VEHICULAR SUSPENSION

BACKGROUND OF THE INVENTION

1. Field of the Invention

The present invention relates to improvements in a supporting structure of a vehicular suspension, and more particularly to an upper link supporting structure of a vehicular suspension.

2. Description of the Prior Art

Hitherto, various types of vehicular suspensions have been proposed and put into practical use. One of these types, in which a wheel supporting portion is supported to an upper link and a lower link, is shown in FIG. 3. In the typical one, an upper link shaft 2 is installed to an upper portion of a side member 1 of a structural member with bolts 3. The opposite end portions of the upper link shaft 2 supports an upper link 4 to be rotatable relative to a generally horizontal axis. A lower link 5 is supported to a lower portion of the side member 1 so as to be rotatable relative to a generally horizontal axis. A shock absorber 6 is installed between the lower link 5 and the side member 1. In order to adjust a wheel camber angle and the like, a shim 7 is inserted between the upper link shaft 2 and the side member 1. Such a suspension structure is disclosed, for example, in "Steering, Suspension" Jidosha Kougaku Zensho (Automotive Engineering Encyclopedia), Vol. 11, p. 117, August, 1985.

However, with the above-mentioned arrangement, since a camber and the like is properly adjusted by the installation of a proper shim between the upper link shaft and the side member, it takes a relatively long time in order to properly adjust the camber or the like.

In order to overcome the above-mentioned problems, another suspension as shown in FIG. 4 has been proposed and practically used. Each end portion of an upper link 4 is pivotably supported to each upper link bracket 8 which is installed to a side member 1. A shock absorber 6 in installed between a lower link (not shown) and a shock absorber bracket 9. The suspension is of a type in which an adjustment of a camber is carried out by adjusting a cam plate installed to a supporting portion of the upper link 4.

However, difficulties have been encountered in the above-discussed upper link supporting structure. For example, although the adjusting operation of the camber at the upper link 4 is easily carried out after the assembly operation of the suspension, it is difficult to keep the assembly accuracy at a high level since the upper link bracket 8 and the like for installing the upper link 4 are respectively connected to the side member 1. Furthermore, it is necessary to increase the thickness of the upper link bracket 8 in order to increase the rigidity of the upper link bracket 8.

SUMMARY OF THE INVENTION

It is therefore an object of the present invention to provide an improved upper link supporting structure with which the adjusting operation is remarkably improved.

Another object of the present invention is to provide an upper link structure having a high rigidity while maintaining its assembly accuracy.

A suspension supporting structure for a vehicle, according to the present invention, comprises a pair of upper link brackets fixed to a side member of the vehicle. The upper link brackets are arranged side by side and have a space therebetween. A rebound bumper unit is attached to a lower portion of at least one of the upper link brackets. A shock absorber bracket is fixed to the upper link brackets.

With this supporting structure, the upper link brackets are integrally fixed with the shock absorber bracket. Therefore, the supporting rigidity for an upper link and a shock absorber are remarkably improved while assembly accuracy is improved as compared with the case in which the upper link brackets are separately fixed to the side member. Furthermore, since the opposite side walls of the rebound bumper unit are fixed respectively to the side inner surfaces of the opposite wall portions and receive the upper link, the installation rigidity of the upper link is improved while the bracket and the upper link brackets received the rebounding force of the upper link to avoid the concentration of the force to a part. Therefore, the rebound bumper unit, the upper link bracket and the shock absorber bracket can be made by a thinner material as compared with the conventional brackets.

BRIEF DESCRIPTION OF THE DRAWINGS

In the drawings, like reference numerals designate like parts and elements throughout all figures, in which.

DETAILED DESCRIPTION OF THE INVENTION

Figure 1:
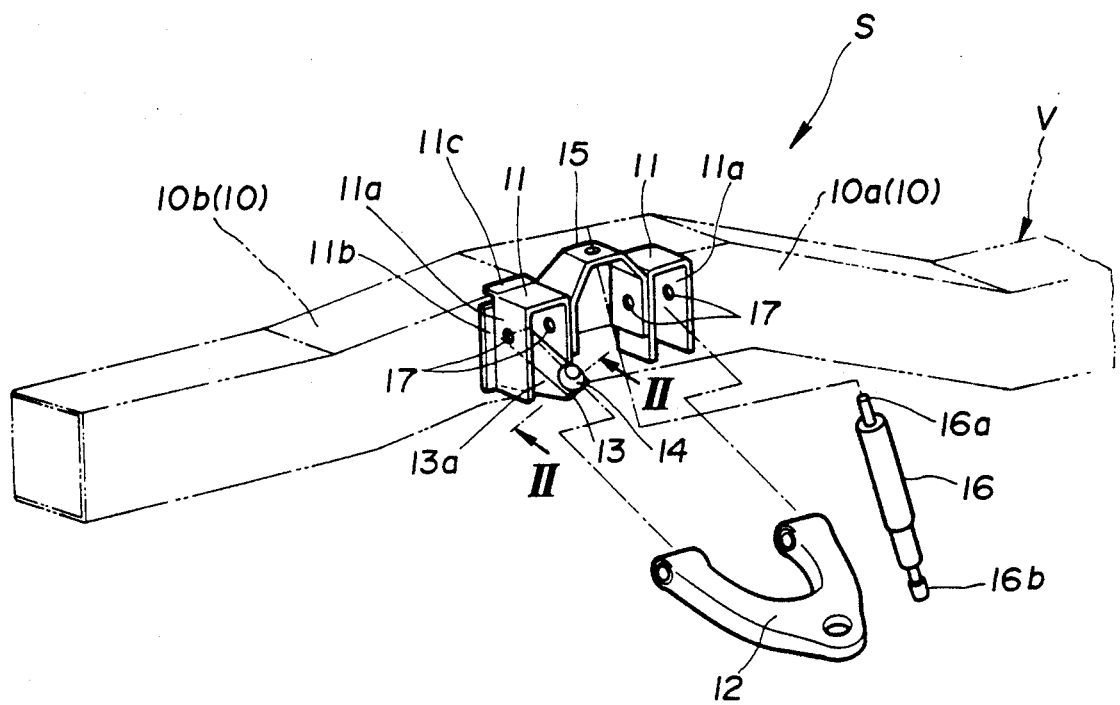
FIG. 1 is a perspective view of an upper link supporting structure of the present invention.
Figure 2:
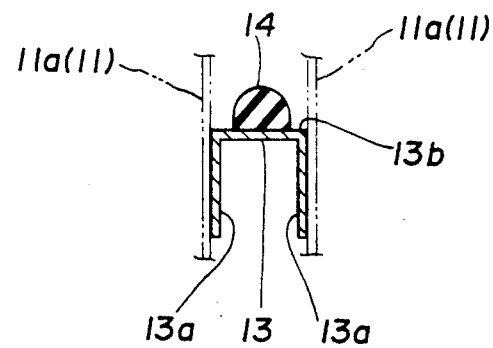
FIG. 2 is a partial cross-sectional view of the upper link supporting structure taken in the direction of arrows substantially along the line II—II.
Figure 3:
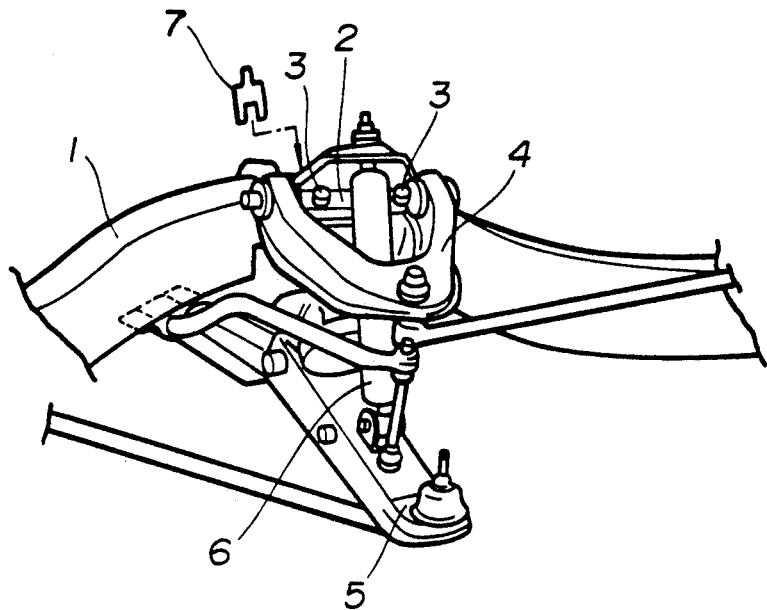
FIG. 3 is a perspective view of a conventional suspension link supporting structure.
Figure 4:
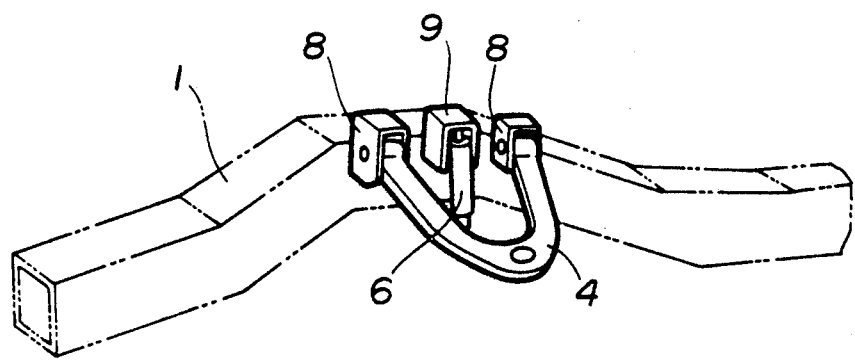
FIG. 4 is a perspective view of another conventional suspension link supporting structure.

Referring now to FIGS. 1 and 2, an embodiment of a supporting structure for a vehicular suspension according to the present invention is illustrated by the reference character S. The suspension supporting structure S is of a type in which an adjustment of a camber is carried out by adjusting a can plate (not shown). The suspension supporting structure S for a vehicle V comprises first and second upper link brackets 11, each of which is formed with a generally U-shaped wall portion 11a and flange portions 11b and 11c. The first and second upper link brackets 11 are fixed at flange portion 11b to a side wall portion 10a of a side member 10 which is a structural member of the vehicle V. The first and second upper link brackets 11 are located side by side on the side wall portion 10a. The opposite ends of the wall portion 11a are directed downward as shown in FIG. 1. The flange portions 11b of the upper link bracket 11 are fixed to a side wall portion of the side member 10. The other flange portion 11c of the upper link bracket 11 is fixed to an upper wall portion 10b of the side member 10.

A shock absorber bracket 15 of a generally U-shape is fixed to opposite wall portions 11a of the first and second upper link brackets 11 as shown in FIG. 1. The first and second upper brackets 11 and the shock absorber bracket 15 have through-holes 17 which are coaxial with each other. An upper link 12 is supported to the first and second upper link brackets 11 and the shock absorber bracket 15 through connecting bolts (not shown) which pass through the through-holes 17. The upper link 12 is rotatable relative to the axis of the through-bolt which extends horizontally.

A bracket 13 which acts as a supporting member for a rebound bumper rubber 14 is formed generally U-shaped in cross-section as shown in FIG. 2. The bracket 13 is fixed at its opposite side walls 13a to one of the upper link brackets by spot welding so as to be located between the opposite ends of the wall portions 11a. The rebound bumper rubber 14 is fixed on an upper surface 13b of the bracket 13 which is downwardly inclined from the side member 10.

A shock absorber 16 is installed to the shock absorber bracket 15 in such a manner that an end 16a of the shock absorber 16 is inserted in a hole 15a of the shock absorber bracket 15. The other end 16b of the shock absorber 16 is connected to a lower link (not shown).

With the thus arranged supporting structure S, the upper link brackets 11 are integrally fixed with the shock absorber bracket 15. Therefore, the supporting rigidity for the upper link 12 and the shock absorber are remarkably improved while an assembly accuracy is improved as compared with the case in which upper link brackets are separately fixed to the side member 10.

Furthermore, since the opposite side walls 13a of the brackets 13 is fixed respectively to the side inner surfaces of the opposite wall portions 11a and receives the upper link 12 through the rebound bumper rubber 14, the installation rigidity of the upper link 12 is improved while the force applied by the rebound of the upper link 12 is received by the bracket 13 and the upper link brackets 11 to avoid the concentration of the force to a part. Therefore, the bracket 13, the upper bracket 11 and the shock absorber bracket 15 can be made by a thinner material as compared with the conventional brackets.

While the present invention is applied to the upper link suspension structure in this embodiment, it will be understood that the present invention can be applied to rear suspensions and the like.

What is claimed is:

1. A supporting structure in combination with an upper link and a shock absorber of a vehicular suspension, said supporting structure comprising:
   a pair of upper link brackets formed in a generally U-shaped and fixed to a side member of a vehicle, said upper link brackets being arranged side by side and defining a space therebetween:
   a rebound bumper unit for receiving the upper link attached to at least one of said upper link brackets so as to be located between wall portions of said at least one of said upper link brackets; and
   a shock absorber bracket for supporting the shock absorber of the vehicular suspension fixed to said pair of upper link brackets.

2. A suspension supporting structure in combination with an upper link and a shock absorber of a vehicle having a side member, said suspension supporting structure comprising:
   a pair of upper link brackets for supporting the upper link of a vehicular suspension fixed to said side member, said upper link brackets being arranged side by side and defining a space therebetween;
   a shock absorber bracket for supporting the shock absorber of the vehicular suspension located between and connecting with said upper link brackets; and
   a rebound bumper unit for receiving a shock caused by the upper link which is attached to a lower portion of at least one of said upper link brackets.

3. A supporting structure as claimed in claim 1, wherein said upper link brackets and said shock absorber brackets support an upper link through connecting bolts.

4. A suspension supporting structure as claimed in claim 2, wherein said rebound bumper unit includes a rubber bumber for receiving said upper link and a bracket for supporting the rubber bumper.

* * * * *